July 3, 1956  H. J. DAVIS ET AL  2,753,192
POWER ACTUATED CONNECTION FACILITATING HITCH
Filed April 12, 1955  2 Sheets-Sheet 1
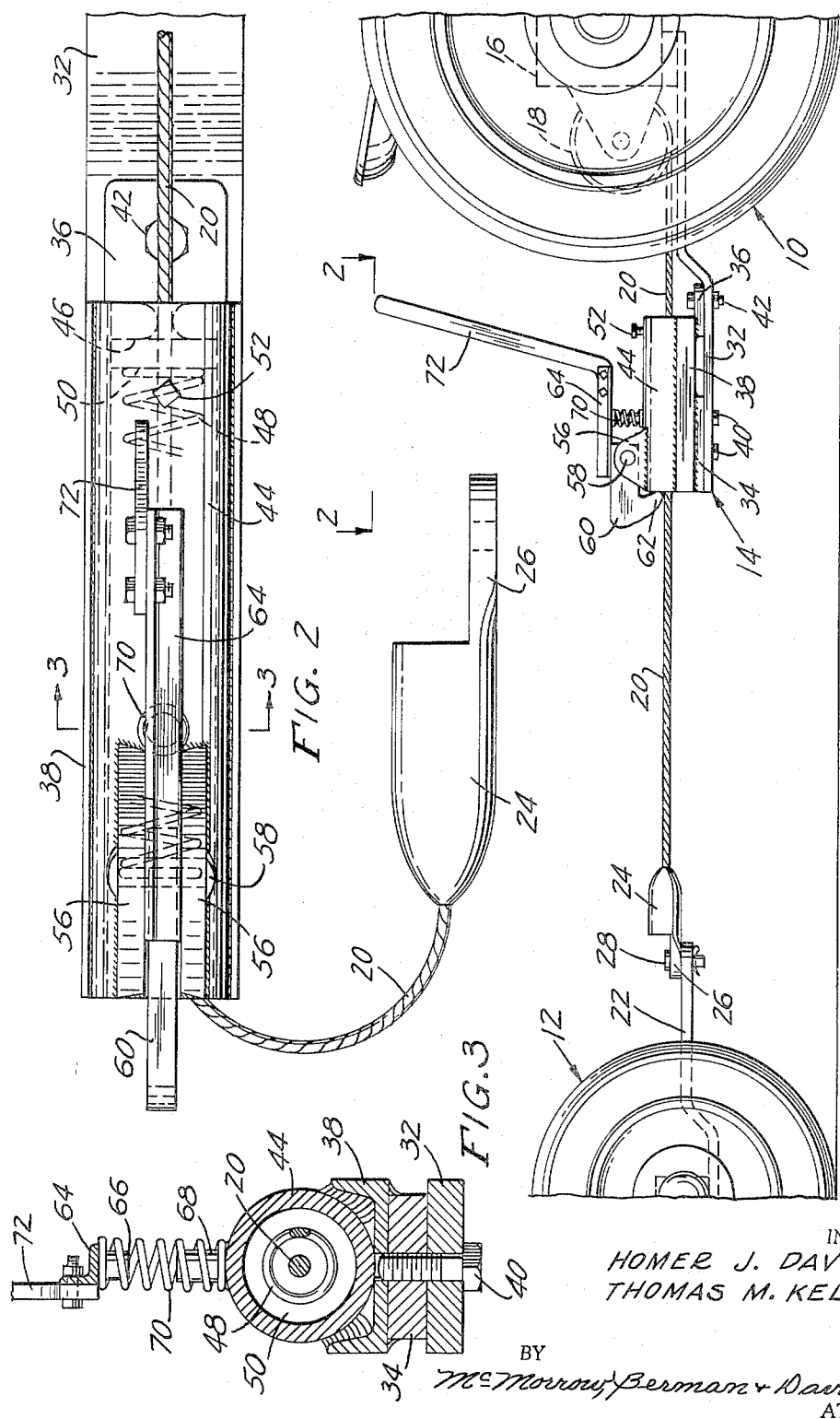
INVENTOR
HOMER J. DAVIS
THOMAS M. KELLER
BY
McMorrow, Berman & Davidson
ATTORNEYS

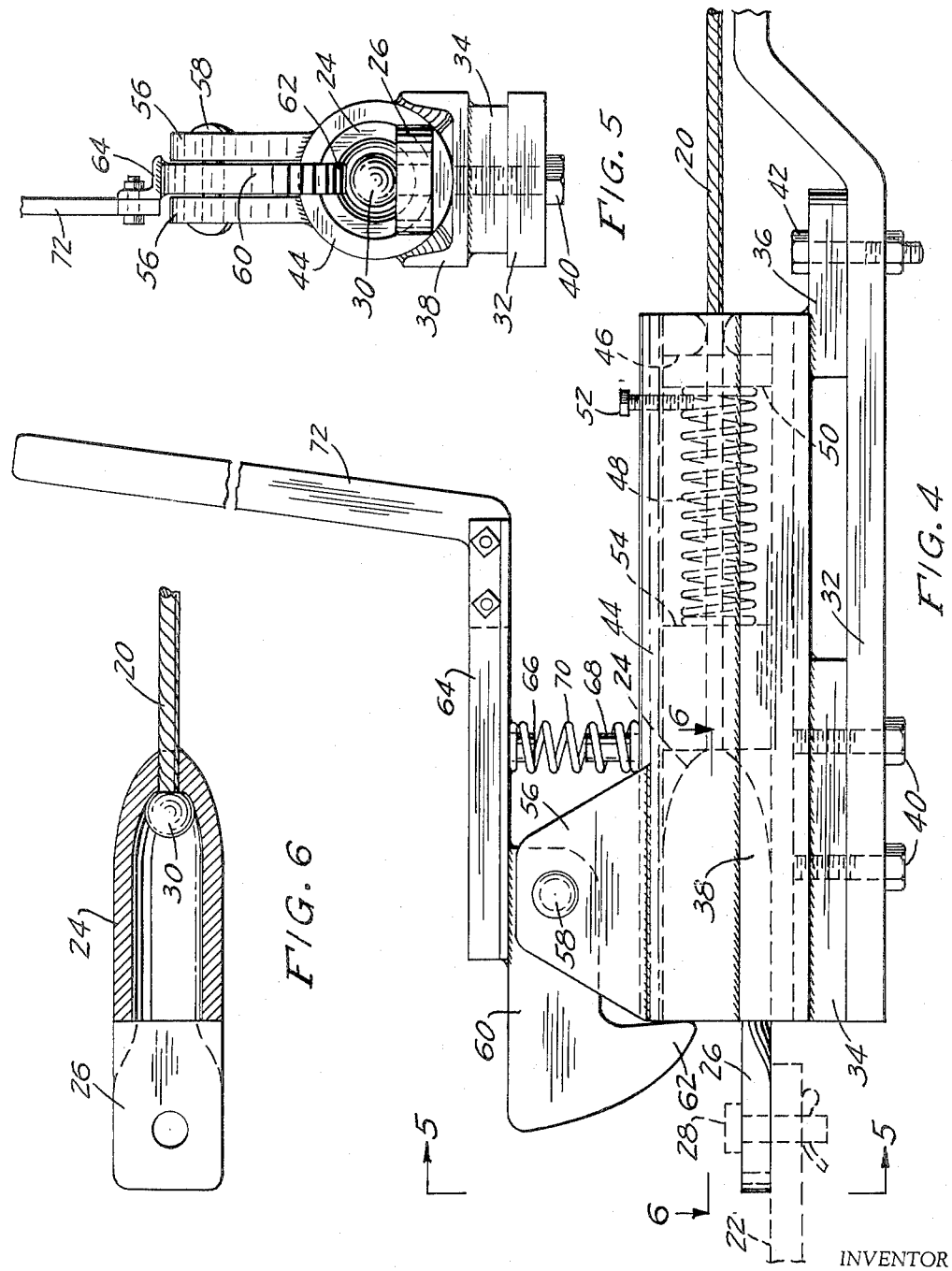

United States Patent Office 2,753,192
Patented July 3, 1956

2,753,192
POWER ACTUATED CONNECTION FACILITATING HITCH

Homer J. Davis, Carthage, and Thomas M. Keller, Sibley, Mo.

Application April 12, 1955, Serial No. 500,851

3 Claims. (Cl. 280—477)

This invention relates to hitches, and more particularly has reference to a device operative to automatically hitch a towed vehicle to a towing vehicle on pulling of the towed vehicle to a location close to the towing vehicle, by means of a power winch carried by the towing vehicle.

The invention has particular adaptability as a hitch mountable on a farm tractor, to be used in connecting to the tractor draw bar a farm implement that is to be pulled behind the tractor. However, the invention has many other possible uses, as for example on bulldozers or other building construction trucks and equipment used to tow a pan or related earth moving equipment. In still another possible application of the invention, the device can be mounted on the rear of the tow car of a garage, for use in towing a vehicle such as a passenger car. It is mainly essential, in the various applications of the invention, that the towing vehicle be equipped with a winch device connectable through the medium of a winch cable to the towed vehicle for the purpose of bringing the towed vehicle into proper position for connection thereof to the hitch.

An important object of the present invention, in this regard, is to provide a hitch which will connect the traction and trailing vehicles without the necessity of backing the traction vehicle up to the towed vehicle, thus to simplify the hitching operation, it being well known that backing the towing vehicle into proper position requires careful manuevering thereof, resulting in considerable loss of time as well as inconvenience to the vehicle operator.

Still another object is to provide a hitching device as stated which will be operative to hitch the towed vehicle to the traction vehicle without necessity of requiring that the two vehicles be located in an exact, spaced relationship to each other at the start of the operation.

A further object of importance is to so design the hitch as to facilitate the unhitching of the towed vehicle with maximum ease and a minimum amount of difficulty, whenever desired.

Still another object of importance is to so design the hitch as to permit it to be disconnected readily, in a manner that will permit the towing vehicle to pull the towed vehicle out of mud, sand, etc. with the towed vehicle being automatically hitched once again to the towing vehicle after it has been pulled out of the area within which it has become bogged down.

A further object of importance is to provide a hitch as described which will be extremely rugged, durable, substantially trouble-free in operation, and will not interfere with manuevering of the traction vehicle, as for example, when a farm tractor is being turned around at the end of the field.

Other objects will appear from the following description, the claims appended thereto, and from the annexed drawing, in which like reference characters designate like parts throughout the several views, and wherein:

Figure 1 is a side elevational view of the hitch as it appears when in use, the traction and trailing vehicles being shown fragmentarily;

Figure 2 is an enlarged top plan view of the hitch per se, as seen from the line 2—2 of Figure 1;

Figure 3 is a transverse sectional view through the hitch on line 3—3 of Figure 2;

Figure 4 is a side elevational view, on an enlarged scale, of the hitch per se;

Figure 5 is a rear end elevational view of the hitch as seen from line 5—5 of Figure 4; and Figure 6 is a longitudinal sectional view through the hitching head, on line 6—6 of Figure 4.

A tractor 10 has been shown in towing relation to a trailer 12, with the two vehicles being connected through the medium of the hitch 14 constituting the present invention. As used hereinafter in the description, the term "tractor" is intended to apply to any traction vehicle to which the invention can be applied, while the term "trailer" includes any trailing vehicle. In the illustrated example, the tractor 10 is a farm tractor, while the trailer 12 is a farm implement to be pulled behind the tractor, but this is shown purely by way of example.

The tractor 10 is equipped with a power take-off 16 adapted for rotating a power winch 18 mounted on the back end of the tractor, the winch 18 including a drum about which is wound a cable 20. The cable 20 is connectable to an implement bar 22 through the medium of a hitching head 24 formed (see Figure 6) as a bullet-nosed, hollow shell formed open at its rear end and having an axial aperture in its leading, tapered end. Welded to the back end of the shell of the hitching head 24 is a rearwardly projecting, short, flat connecting bar 26 adapted to overlie the leading end of the implement bar 22, the bars 22, 26 having registering openings adapted to receive a drop pin 28.

If the device is to be used on the back of a tow truck or the like, the connecting bar 26 may be slightly modified to permit connection thereof to the bumper of a passenger car or the like, but in each instance, the hitching head would include the hollow, forwardly tapering shell.

Cable 20, as shown in Fig. 6, has an enlargement 30 such as a metal ball permanently secured to the cable after extension of the cable through the axial opening of the hitching head shell, the enlargement 30 engaging in the tapered leading end portion of the shell to permanently connect the shell to the cable.

In the illustrated example, the tractor 10 is equipped with a swinging draw bar 32, said draw bar swinging in a horizontal plane and having a downwardly offset trailing end portion. Supported upon the downwardly offset end portion of the draw bar are flat mounting or spacer bars 34, 36, spaced longitudinally of the draw bar and welded to the opposite end portions (see Figure 4) of an upwardly opening channel 38. The draw bar, spacer bar 34, and channel 38 have longitudinally spaced, registering openings receiving connecting bolts for attaching the hitch fixedly to the draw bar, with the spacer bar 36 and draw bar also having registering openings receiving a connecting bolt 42.

Referring to Figure 3, seated in the channel and coextensive in length therewith is an elongated, cylindrical housing 44 welded to the channel and having at its leading end an end wall 46 having a chamfered center opening providing a guide aperture through which the cable 20 extends, the cable extending full through the housing longitudinally of the housing.

A compression spring 48 is welded at one end to a plate 50 centrally apertured for extension of the cable 20 therethrough, and a set screw 52 threadable in the housing wall adjacent the front end thereof, is engageable with one end of the spring to anchor said one end of the spring and the plate 50 against movement longitudinally of the housing. At its other end, the spring is welded to a cylindrical block 54 slidably mounted in the housing and having an axial bore through which cable 20 extends. When the spring is fully expanded, the outer end of block 54 registers with the open rear end of the housing.

Transversely spaced, upstanding pivot brackets 56, welded to the housing at the rear end thereof, have transversely aligned openings receiving a pivot pin 58 passing through the inner end of a latch 60 the outer end of which is integrally formed with a depending latching tooth 62 the inner end of which, in the operative position of the latch, extends substantially perpendicularly to the length of housing 44, the outer edge of the tooth being oblique to said length as shown in Figure 4.

The inner end of latch 60 is welded to the underside of the rear end portion of a handle 64 formed of angle iron material and extending in parallelism with the housing above the housing. A depending boss 66 fixedly secured to the intermediate portion of handle 64 projects toward an upstanding boss 68 formed upon the top surface of the housing 44, and a compression spring 70 receives the bosses, to normally swing the handle 64 upwardly, to dispose the latch 60 in a position in which its tooth 62 will extend partially across the open end of the housing 44. Bolted to the front end of the handle 64 is an upstanding handle extension 72.

In use, the parts will appear as in Figure 1, initially. As a first step, the vehicle operator, by means of the drop pin 28, connects the hitching head 24 to the implement bar 22. The power winch is now operated to wind cable 20, and when the tapered nose of the hitching head arrives at the open rear end of housing 44, it will be centered with the housing automatically due to the fact that the slide block 44, having the axial guide bore through which the cable 20 extends, will be flush with the rear end of the housing. As the nose of the hitching head reaches the rear end of the housing, it will engage the oblique outer edge of latching tooth 62, and will, cammingly bias the latch clockwise about pivot 58 to permit the hitching head to enter the housing.

Continued operation of the winch will pull the tapered shell of the hitching head fully into the housing, until the back end surface of said shell is flush with the rear end of the housing 44, in the position shown in Figure 4. Spring 48, of course, will have been placed under compression, by advancement of the hitching head into the housing, with the slide block 44 now being disposed intermediate opposite ends of the housing. When the hitching head moves fully into the housing to the Figure 4 position thereof, the spring 70 will expand, turning latch 60 counterclockwise about pivot 58, to dispose the latching tooth 62 partially across the open rear end of housing 44, to prevent retrograde movement of the hitching head 24.

The two vehicles will now be properly hitched, for towing of the trailer 12 by tractor 10.

At such time as it is desired to unhitch the vehicles, one need only grasp handle extension 72, and swing the same to the right in Figure 4, thus shifting latch 60 out of engagement with the hitching head and freeing the head for movement out of the housing.

The construction, as will be readily appreciated, does not require backing up of the tractor 10, and instead, the towed vehicle is pulled up to the hitch by operation of the winch, thus eliminating careful maneuvering and eliminating, further, the necessity of exact predetermination of the relative locations of the tractor and trailer previous to the hitching operation. The two vehicles can, in fact, initially be disposed angularly to one another, with the draw bar 30 automatically swinging about under pull of the cable 20, as the hitching head 24 approaches the housing 44, to properly align the hitching head with the housing prior to movement of the hitching head into the housing.

The device, further, permits pulling of the trailer out of mud or sand, with minimum difficulty. Assuming that the vehicles are connected by means of the hitch, and that the trailer bogs down, one need only disengage the latch, after which the hitching head 24 is pulled from housing 44, and remains with the trailer as the tractor is driven onto solid ground. Cable 20 unrolls from the winch as the tractor moves to solid ground. After the tractor has reached solid ground, the winch is placed in operation to pull the trailer to the tractor with the hitch 14 then automatically coupling them together.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. The combination, with a winch mounted on a traction vehicle and including a cable windable on a drum of the winch, of a hitch comprising: a housing formed open at one end, said cable running through the housing; means for mounting the housing on said traction vehicle; a hitching head on the cable adapted for connection to a towed vehicle and having a tapered nose to guide the head into the housing on winding of the cable on the drum; a block slidably mounted in the housing and having an axial guide bore through which the cable extends; a spring held under compression between the other end of the housing and said block and normally shifting the block into flush relation with said one end of the housing to guide the tapered nose into axial alignment with the housing preliminary to movement of the head into the housing; and latching means on the housing extending in the path of retrograde movement of the head following movement of the head into the housing to engage the head within the housing.

2. The combination, with a winch mounted on a traction vehicle and including a cable windable on a drum of the winch, of a hitch comprising: a housing formed open at one end, said cable running through the housing; means for mounting the housing on said traction vehicle; a hitching head on the cable adapted for connection to a towed vehicle and having a tapered nose to guide the head into the housing on winding of the cable on the drum; a block slidably mounted in the housing and having an axial guide bore through which the cable extends; a spring held under compression between the other end of the housing and said block and normally shifting the block into flush relation with the said one end of the housing to guide the tapered nose into axial alignment with the housing preliminary to movement of the head into the housing; and latching means on the housing extending in the path of retrograde movement of the head to prevent movement of the head from the housing, said latching means including a latched tooth having one edge disposed substantially normally to the length of the housing in the latching position of the latch means, and a second edge disposed obliquely to the length of the housing to provide a cam surface engageable by the tapered nose when said nose is disposed in axial alignment with the housing preliminary to movement of the hitching head into the housing.

3. The combination, with a winch mounted on a traction vehicle and including a cable windable on a drum of the winch, of a hitch comprising: a housing formed open at one end, said cable running through the housing; means for mounting the housing on said traction vehicle; a hitching head on the cable adapted for connection to a towed vehicle, said hitching head including a hollow shell formed at one end with a tapered nose having a central aperture through which the cable extends, the cable including an enlargement disposed within the shell engageable in back of said nose to prevent relative longitudinal movement of the shell and cable in one direction, and a connecting bar rigid with and extending rearwardly from the other end of the shell, said connecting bar having means adapted to receive a connection of a towed vehicle; guide means for the cable mounted in the housing for sliding movement longitudinally of the housing, said guide means being spring-biased into flush relation with said one end of the housing to guide the tapered nose into axial alignment with the housing on winding of the cable; and latching means carried by the housing adapted to extend partially across said one end of the housing following movement of the hitching head into the housing, to prevent retograde movement of said hitching head.

References Cited in the file of this patent

UNITED STATES PATENTS

| | | |
|---|---|---|
| 2,135,972 | Garlinger | Nov. 8, 1938 |
| 2,150,010 | Solomon | Mar. 7, 1939 |

FOREIGN PATENTS

| | | |
|---|---|---|
| 710,947 | Great Britain | June 23, 1954 |